(12) United States Patent
Suga et al.

(10) Patent No.: US 12,209,612 B2
(45) Date of Patent: Jan. 28, 2025

(54) SLIDING MEMBER

(71) Applicant: TAIHO KOGYO CO., LTD., Toyota (JP)

(72) Inventors: Shigeyuki Suga, Toyota (JP); Hironori Sugitani, Toyota (JP)

(73) Assignee: TAIHO KOGYO CO., LTD., Toyota (JP)

( * ) Notice: Subject to any disclaimer, the term of this patent is extended or adjusted under 35 U.S.C. 154(b) by 51 days.

(21) Appl. No.: 18/013,457

(22) PCT Filed: Jun. 28, 2021

(86) PCT No.: PCT/JP2021/024335
§ 371 (c)(1),
(2) Date: Dec. 28, 2022

(87) PCT Pub. No.: WO2022/019059
PCT Pub. Date: Jan. 27, 2022

(65) Prior Publication Data
US 2023/0235787 A1    Jul. 27, 2023

(30) Foreign Application Priority Data

Jul. 22, 2020  (JP) .................................. 2020-125470

(51) Int. Cl.
*F16C 33/12*  (2006.01)
*C22C 12/00*  (2006.01)
*F16C 17/02*  (2006.01)

(52) U.S. Cl.
CPC ............ *F16C 33/121* (2013.01); *C22C 12/00* (2013.01); *F16C 17/02* (2013.01)

(58) Field of Classification Search
None
See application file for complete search history.

(56) References Cited

U.S. PATENT DOCUMENTS

| 2004/0241489 A1* | 12/2004 | Kawachi ................ C25D 5/611 |
| | | 428/642 |
| 2014/0287253 A1 | 9/2014 | Asakura et al. |
| 2019/0203769 A1* | 7/2019 | Suga ..................... F16C 33/121 |

FOREIGN PATENT DOCUMENTS

| DE | 10 2014 103 844 A1 | 9/2014 |
| FR | 3 003 616 A1 | 9/2014 |
| GB | 2514889 A | 10/2014 |
| JP | 2014-185378 A | 10/2014 |
| JP | 6087684 B2 | 3/2017 |
| JP | 6621562 B1 | 12/2019 |
| KR | 10-2014-0116791 A | 10/2014 |
| WO | 2019/198369 A1 | 10/2019 |

OTHER PUBLICATIONS

Japanese Office Action issued Nov. 1, 2023 in Application No. 2022-538659.

(Continued)

*Primary Examiner* — Kim S. Horger
(74) *Attorney, Agent, or Firm* — Sughrue Mion, PLLC (57) ABSTRACT

A sliding member including an overlay capable of realizing good fatigue resistance while preventing interlayer peeling. The sliding member including an overlay formed of an alloy plating film of Bi and Sb, wherein Bi—Sb oxide is formed on a surface of the overlay.

4 Claims, 3 Drawing Sheets

(56) References Cited

OTHER PUBLICATIONS

Japanese Office Action issued Mar. 12, 2024 in Application No. 2022-538659.
International Search Report for PCT/JP2021/024335 dated Aug. 31, 2021 [PCT/ISA/210].
Extended European Search Report issued Jun. 19, 2024 in Application No. 21846620.9.

* cited by examiner

SLIDING MEMBER

CROSS REFERENCE TO RELATED APPLICATIONS

This application is a National Stage of International Application No. PCT/JP2021/024335 filed Jun. 28, 2021, claiming priority based on Japanese Patent Application No. 2020-125470 filed Jul. 22, 2020.

TECHNICAL FIELD

The present invention relates to a sliding member including an overlay of an alloy plating film of Bi and Sb.

BACKGROUND ART

Conventionally, a sliding member including an overlay made of Bi is known. For example, Patent Literature 1 discloses a technique for improving seizure resistance by forming bismuth oxide on a surface of an overlay.

CITATIONS LIST

Patent Literature

Patent Literature 1: JP 6087684 B

SUMMARY OF INVENTION

Technical Problems

However, when the sliding member of Patent Literature 1 is used in engine oil, oxidation proceeds, and the thickness of bismuth oxide increases. Bismuth oxide is hard and brittle, and, therefore, when a large amount of bismuth oxide is present in the overlay, the bismuth oxide, for example, falls off from the overlay during use, leading to a deterioration in fatigue resistance.

The present invention has been made in view of the above problems, and an object thereof is to improve fatigue resistance.

Solutions to Problems

In order to achieve the above object, the sliding member is a sliding member including an overlay formed of an alloy plating film of Bi and Sb, wherein Bi—Sb oxide is formed on a surface of the overlay.

The Bi—Sb oxide is more resistant to brittle fracture than bismuth oxide. In addition, the presence of the Bi—Sb oxide on a surface of the overlay prevents production and growth of bismuth oxide. Therefore, the Bi—Sb oxide formed on the surface of the overlay can prevent, for example, falling-off of bismuth oxide, and can improve the fatigue resistance of the sliding member.

DESCRIPTION OF EMBODIMENTS

An embodiment of the present invention will be described in the following order.
(1-1) Structure of sliding member:
(1-2) Method for manufacturing sliding member:
(2) Experimental result:
(3) Other embodiments:

(1-1) Structure of Sliding Member

Figure 1:
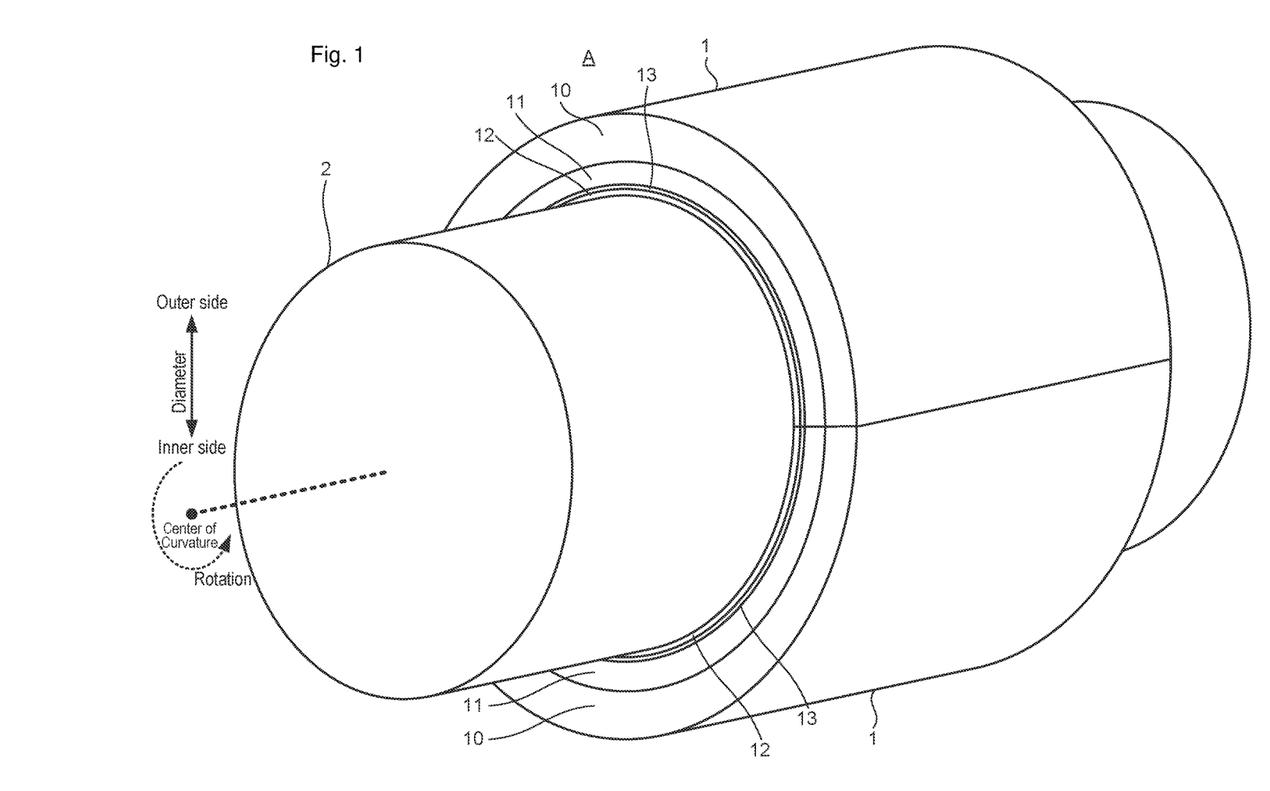
FIG. 1 is a perspective view of a sliding member according to an embodiment of the present invention.

FIG. 1 is a perspective view of a sliding member 1 according to one embodiment of the present invention. The sliding member 1 includes a back metal 10, a lining 11, and an overlay 12. The sliding member 1 is a half-shaped metallic member obtained by dividing a hollow cylinder into two equal parts in a diametrical direction, and has a semi-circular arc shape in cross section. By combining the two sliding members 1 so as to form a cylindrical shape, a sliding bearing A is formed. The sliding bearing A bears a cylindrical counter shaft 2 (crankshaft of an engine) in a hollow portion formed therein. The outer diameter of the counter shaft 2 is formed to be slightly smaller than the inner diameter of the sliding bearing A. A lubricating oil (engine oil) is supplied to a gap formed between the outer peripheral surface of the counter shaft 2 and the inner peripheral surface of the sliding bearing A. At that time, the outer peripheral surface of the counter shaft 2 slides on the inner peripheral surface of the sliding bearing A.

The sliding member 1 has a structure in which the back metal 10, the lining 11, an intermediate layer 13, and the overlay 12 are laminated in an order of being distant from the center of curvature. Therefore, the back metal 10 constitutes the outermost layer of the sliding member 1, and the overlay 12 constitutes the innermost layer of the sliding member 1. The back metal 10, the lining 11, the intermediate layer 13 and the overlay 12 each have a constant thickness in the circumferential direction. The thickness of the back metal 10 is, for example, 1.5 mm, the thickness of the lining 11 is, for example, 0.2 mm to 0.3 mm, the thickness of the intermediate layer 13 is, for example, 1.0 to 7.0 μm, and the thickness of the overlay 12 is, for example, 3 to 20 μm. Twice the radius of the surface on the curvature center side of the overlay 12 (the inner diameter of the sliding member 1) is, for example, 55 mm. The width of the sliding bearing A is, for example, 19 mm. Hereinafter, the term "inner side" means the curvature center side of the sliding member 1, and the term "outer side" means the side opposite to the center of curvature of the sliding member 1. The inner surface of the overlay 12 constitutes the sliding surface for the counter shaft 2.

In the present embodiment, the back metal 10 is, for example, formed of steel containing 0.15 mass % of C and 0.06 mass % of Mn, with the balance being Fe. It suffices that the back metal 10 is formed of a material that can support the load from the counter shaft 2 via the lining 11 and the overlay 12, and the back metal 10 may not necessarily be formed of steel.

The lining 11 is a layer laminated on the inner side of the back metal 10 and constitutes a base layer. In the present embodiment, the lining 11 is composed of a Cu alloy. The element contained in the lining 11 is not limited, and, for example, the lining 11 is composed of a Cu—Bi alloy. Of course, elements other than Cu and Bi may be added, and, for example, the lining 11 can be composed of a Cu alloy containing 5 mass % of Bi, 5 mass % of Sn, and 5 mass % of Ni, with the balance being Cu. In addition, the lining 11 can be composed of a Cu alloy containing 3 mass % of Bi and 3 mass % of In, with the balance being Cu.

Furthermore, the lining 11 may be an alloy other than the Cu alloy, for example, an Al alloy. Various elements are assumed also as elements to be added to the Al alloy, and examples thereof include Sn, Si, and Mg. More specifically, for example, the lining 11 can be composed of an Al alloy containing 7 mass % of Sn and 3 mass % of Si, with the balance being Al. In addition, the lining 11 can be composed of an Al alloy containing 3 mass % of Mg, with the balance being Al.

Of course, the presence or absence and concentrations of these elements are examples, and unavoidable impurities may be contained. The unavoidable impurities of the lining 11 are Mg, Ti, B, Pb, Cr, and the like, and impurities mixed in refining or scrapping are assumed. The content of the unavoidable impurities in the lining 11 is, for example, 0.5 mass % or less in total.

The intermediate layer 13 may be absent, or may be provided to use various functions. For example, in configurations in which the lining 11 is made of a Cu alloy, when the intermediate layer 13 containing Ag as a main component is formed between the overlay 12 and the lining 11, the amount of Cu to be diffused from the lining 11 into the overlay 12 can be reduced, and the possibility of a deterioration in fatigue resistance can be reduced. The intermediate layer containing Ag as a main component may be made of, for example, pure Ag or Ag—Sn. In the latter case, the concentration of Sn may be, for example, 20 mass %.

The intermediate layer 13 may be composed of a plurality of layers. For example, in configurations in which the lining is made of an Al alloy, a first intermediate layer containing Cu as a main component may be formed on the lining 11, and a second intermediate layer containing Ag as a main component may be formed between the first intermediate layer and the overlay 12. In these configurations, the first intermediate layer may be made of, for example, pure Cu. The second intermediate layer may be made of, for example, pure Ag or Ag—Sn. In the latter case, the concentration of Sn may be, for example, 20 mass %. Of course, the configuration of the intermediate layer is not limited to these examples, and, for example, the first intermediate layer containing Ag as a main component may be formed on various linings, and the second intermediate layer containing Ag—Sn as a main component may be formed between the first intermediate layer and the overlay 12.

According to the above configuration, the second intermediate layer containing Ag as a main component can reduce the amount of Cu to be diffused from Cu of the first intermediate layer into the overlay 12, and can reduce the possibility of a deterioration in fatigue resistance. In addition, since the first intermediate layer is formed of Cu, the possibility of interlayer peeling between the second intermediate layer and the lining 11 can be reduced. The intermediate layer 13 may contain unavoidable impurities. The content of the unavoidable impurities in the intermediate layer 13 is, for example, 0.5 mass % or less in total.

The overlay 12 is a layer laminated on the inner surface of the lining 11. The overlay 12 is an alloy plating film of Bi and Sb, and Bi—Sb oxide is formed on a surface thereof. The overlay 12 may contain unavoidable impurities. The content of the unavoidable impurities in the overlay 12 is, for example, 0.5 mass % or less in total.

According to the above configuration, for example, the sliding member can be formed by the overlay 12 having a thickness of 8 to 20 µm, the intermediate layer 13 having a thickness of 2 µm and made of Ag—Sn, the lining 11 having a thickness of 0.2 mm and made of a Cu alloy, and the back metal 10 having a thickness of 1.5 mm. Also, for example, the sliding member can be formed by the overlay 12 having a thickness of 3 to 10 µm, the second intermediate layer having a thickness of 3 to 6 µm, the first intermediate layer having a thickness of 1 µm, the lining 11 having a thickness of 0.3 mm and made of an Al alloy, and the back metal 10 having a thickness of 1.5 mm.

(1-2) Method for Manufacturing Sliding Member

Bi—Sb oxide is formed on a surface of the overlay 12 according to the present embodiment. The overlay 12 is formed by oxidizing an alloy plating film of Bi and Sb. Here, an example of a method for manufacturing a sliding member will be described by taking, as an example, a configuration in which the lining 11 is made of a Cu alloy containing Sn, Ni, and Bi, and the intermediate layer 13 is made of Ag—Sn. In an example of the method for manufacturing a sliding member, first, a flat plate of low carbon steel having the same thickness as the back metal 10 is prepared.

Next, powder of a material constituting the lining 11 is scattered on the flat plate formed of low carbon steel. Specifically, for example, Cu, Sn, Ni, and Bi powders are scattered on the flat plate of low carbon steel so as to attain the mass ratio among the respective components in the lining 11 described above. It suffices that the mass ratio among the respective components is satisfied in the lining 11, and alloy powder such as Cu—Sn, Cu—Ni, or Cu—Bi may be scattered on the flat plate of low carbon steel. The particle sizes of the powders may be adjusted, for example, to 150 µm or less by a test sieve (JIS Z 8801).

Next, the flat plate of low carbon steel and the powders scattered on the flat plate are sintered. The sintering temperature was controlled to 700 to 1000° C., and the sintering is performed in an inert atmosphere. After the sintering, the sintered flat plate is cooled. The lining 11 need not necessarily be formed by sintering, and may be formed by casting or the like. After completion of the cooling, a Cu alloy layer is formed on the flat plate of low carbon steel.

Next, the low carbon steel having a Cu alloy layer formed thereon is pressed so as to have a shape obtained by dividing a hollow cylinder into two equal parts in the diameter direction. At this time, the pressing process is performed so that the outer diameter of the low carbon steel is matched with the outer diameter of the sliding member 1.

Next, the surface of the Cu alloy layer formed on the back metal 10 is cut. At this time, the cutting amount is controlled so that the thickness of the Cu alloy layer formed on the back metal 10 is the same as that of the lining 11. Thus, the lining 11 is formed by the Cu alloy layer after the cutting process. The cutting process is performed by a lathe with a cutting tool material formed, for example, of sintered diamond set.

Next, Ag and Sn are laminated, for example, with a thickness of 2 µm, on the surface of the lining 11 by electroplating to form the intermediate layer 13. Here, the concentrations of Ag and Sn formed as the intermediate layer 13 can be adjusted by adjusting metal ion concentrations in a plating bath.

Next, Bi and Sb are laminated, for example, with a thickness of 8 to 20 µm, on the surface of the intermediate layer 13 by electroplating. The electroplating procedures are as follows. First, the surface of the intermediate layer 13 is washed with water. Further, unnecessary oxides are removed from the surface of the intermediate layer 13 by pickling the surface of the intermediate layer 13. Thereafter, the surface of the intermediate layer 13 is again washed with water.

Upon completion of the above pretreatment, a current is supplied to the lining 11 immersed in the plating bath, and electroplating is performed. The bath composition of the plating bath contained, for example, methane sulfonic acid:

150 g/L, methane sulfonic acid Bi: 20 g/L, and an organic surfactant: 25 g/L. In the above plating bath, for example, 1.0 g/L of pure Sb was dissolved by electrolysis. The bath temperature of the plating bath was set to 30° C. Further, the current to be supplied to the lining 11 was a direct current, and the current density was set to 2.0 A/dm$^2$.

In the plating bath, for example, the amount of methane sulfonic acid can be adjusted between 50 and 250 g/L, the amount of methane sulfonic acid Bi can be adjusted between 5 and 40 g/L, the amount of Sb to be dissolved can be adjusted between 0.3 to 1.5 g/L, and the amount of the organic surfactant can be adjusted between 0.5 and 50 g/L. Also, the bath temperature of the plating bath can be adjusted between 20 and 50° C., and the current density of the current to be supplied to the lining 11 can be adjusted between 0.5 and 7.5 A/dm$^2$. The concentration of Sb in the overlay 12 can be increased by increasing the ion concentration of Sb in the plating bath.

After the electroplating is performed in the above manner, water washing and drying are performed. Next, an oxide film is formed on the surface of the overlay 12. Examples of a method for forming the oxide film include various techniques. For example, oxide film formation can be realized by an oxidation treatment in which, after electroplating, water washing and drying, the product is immersed in paraffin oil containing 1000 ppm of an organic peroxide (methyl ethyl ketone peroxide, cumene hydroperoxide, or the like) and heated at 150° C. for 50 hours. In addition, the oxidation treatment may be performed, for example, by a treatment of heating the electroplated, water washed, and dried product at 200° C. for 50 hours in an air atmosphere.

When the lining 11 is made of an Al alloy, for example, a molten material of the lining 11 is injected into a mold, and pulled out in a casting direction from an opening of the mold, whereby a continuously-cast plate of the lining 11 is formed. Next, the continuously-cast plate of the lining 11 is cold-rolled until the thickness of the lining 11 is attained. Furthermore, a low-carbon steel plate of the back metal 10 is also cold-rolled together to form a rolled plate in which the continuously-cast plate of the lining 11 and the low-carbon steel plate of the back metal 10 are pressure-bonded.

Further, the intermediate layer 13 is formed by electroplating or the like. When the intermediate layer 13 is composed of the first intermediate layer and the second intermediate layer, for example, Cu is laminated, with a thickness of 1 μm or the like, on the surface of the lining 11 by electroplating to form the first intermediate layer. Also, Ag or the like is laminated, with a thickness of 3 to 6 μm or the like, on the surface of the first intermediate layer by electroplating to form the second intermediate layer.

(2) Experimental Result

As described above, an oxide film is formed on the surface of the overlay 12, whereby the sliding member 1 is completed. Further, by combining the two sliding members 1 into a cylindrical shape, a sliding bearing is formed. In the sliding member 1 described above, it suffices that both Bi and Sb exist in the overlay 12 (the amounts of these elements are both more than 0 mass %), and the Sb concentration is arbitrary.

TABLE 1

| | Sb concentration (mass %) of overlay | Intermediate layer | Lining | Oxidation treatment (oxidation method) | 0 μm (Outermost surface) | 0.01 μm | 0.05 μm | 0.1 μm | 1 μm | 3 μm | Fatigue area rate (%) |
|---|---|---|---|---|---|---|---|---|---|---|---|
| | | | | | Main composition at each depth position from outermost surface (before test) | | | | | | |
| Example 1 | 2.0 | Ag—Sn | Cu alloy | Performed (in oil) | Bi—Sb—O | Bi Sb | Bi Sb | Bi Sb | Bi Sb | Bi Sb | 12.3 |
| Example 2 | 3.0 | Ag—Sn | Cu alloy | Performed (in oil) | Bi—Sb—O | Bi—Sb—O | Bi—Sb—O | Sb2O3 Bi—Sb—O | Bi Sb | Bi Sb | 5.3 |
| Example 3 | 5.0 | Ag—Sn | Cu alloy | Performed (in oil) | Bi—Sb—O | Bi—Sb—O | Bi—Sb—O | Sb2O3 Bi—Sb—O | Bi Sb | Bi Sb | 1.5 |
| Example 4 | 7.0 | Ag—Sn | Cu alloy | Performed (in oil) | Bi—Sb—O | Bi—Sb—O | Bi—Sb—O | Sb2O3 Bi—Sb—O | Bi Sb | Bi Sb | 1.2 |
| Example 5 | 10.0 | Ag—Sn | Cu alloy | Performed (in oil) | Bi—Sb—O | Bi—Sb—O | Bi—Sb—O | Sb2O3 Bi—Sb—O | Bi Sb | Bi Sb | 8.8 |
| Example 6 | 12.0 | Ag—Sn | Cu alloy | Performed (in oil) | Bi—Sb—O | Bi—Sb—O | Bi—Sb—O | Sb2O3 Bi—Sb—O | Bi Sb | Bi Sb | 15.6 |
| Example 7 | 2.0 | Ag | Al alloy | Performed (in oil) | Bi—Sb—O | Bi Sb | Bi Sb | Bi Sb | Bi Sb | Bi Sb | 13.4 |
| Example 8 | 3.0 | Ag | Al alloy | Performed (in oil) | Bi—Sb—O | Bi—Sb—O | Bi—Sb—O | Sb2O3 Bi—Sb—O | Bi Sb | Bi Sb | 6.2 |
| Example 9 | 5.0 | Ag | Al alloy | Performed (in oil) | Bi—Sb—O | Bi—Sb—O | Bi—Sb—O | Sb2O3 Bi—Sb—O | Bi Sb | Bi Sb | 2.4 |
| Example 10 | 7.0 | Ag | Al alloy | Performed (in oil) | Bi—Sb—O | Bi—Sb—O | Bi—Sb—O | Sb2O3 Bi—Sb—O | Bi Sb | Bi Sb | 2.0 |
| Example 11 | 10.0 | Ag | Al alloy | Performed (in oil) | Bi—Sb—O | Bi—Sb—O | Bi—Sb—O | Sb2O3 Bi—Sb—O | Bi Sb | Bi Sb | 10.2 |
| Example 12 | 12.0 | Ag | Al alloy | Performed (in oil) | Bi—Sb—O | Bi—Sb—O | Bi—Sb—O | Sb2O3 Bi—Sb—O | Bi Sb | Bi Sb | 15.9 |
| Example 13 | 5.0 | Cu Ag | Al alloy | Performed (in oil) | Bi—Sb—O | Bi—Sb—O | Bi—Sb—O | Sb2O3 Bi—Sb—O | Bi Sb | Bi Sb | 2.4 |

TABLE 2

| | Sb concentration (mass %) of overlay | Intermediate layer | Lining | Oxidation treatment (oxidation method) | Main composition at each depth position from outermost surface (before test) | | | | | | Fatigue area rate (%) |
|---|---|---|---|---|---|---|---|---|---|---|---|
| | | | | | 0 µm (Outermost surface) | 0.01 µm | 0.05 µm | 0.1 µm | 1 µm | 3 µm | |
| Comparative Example 1 | 2.0 | Ag—Sn | Cu alloy | Not performed | Bi Sb | Bi Sb | Bi Sb | Bi Sb | Bi Sb | Bi Sb | 28.7 |
| Comparative Example 2 | 3.0 | Ag—Sn | Cu alloy | Not performed | Bi Sb | Bi Sb | Bi Sb | Bi Sb | Bi Sb | Bi Sb | 18.2 |
| Comparative Example 3 | 5.0 | Ag—Sn | Cu alloy | Not performed | Bi Sb | Bi Sb | Bi Sb | Bi Sb | Bi Sb | Bi Sb | 11.3 |
| Comparative Example 4 | 7.0 | Ag—Sn | Cu alloy | Not performed | Bi Sb | Bi Sb | Bi Sb | Bi Sb | Bi Sb | Bi Sb | 10.2 |
| Comparative Example 5 | 10.0 | Ag—Sn | Cu alloy | Not performed | Bi Sb | Bi Sb | Bi Sb | Bi Sb | Bi Sb | Bi Sb | 16.8 |
| Comparative Example 6 | 12.0 | Ag—Sn | Cu alloy | Not performed | Bi Sb | Bi Sb | Bi Sb | Bi Sb | Bi Sb | Bi Sb | 21.1 |
| Comparative Example 7 | 2.0 | Ag | Al alloy | Not performed | Bi Sb | Bi Sb | Bi Sb | Bi Sb | Bi Sb | Bi Sb | 30.1 |
| Comparative Example 8 | 3.0 | Ag | Al alloy | Not performed | Bi Sb | Bi Sb | Bi Sb | Bi Sb | Bi Sb | Bi Sb | 19.3 |
| Comparative Example 9 | 5.0 | Ag | Al alloy | Not performed | Bi Sb | Bi Sb | Bi Sb | Bi Sb | Bi Sb | Bi Sb | 12.5 |
| Comparative Example 10 | 7.0 | Ag | Al alloy | Not performed | Bi Sb | Bi Sb | Bi Sb | Bi Sb | Bi Sb | Bi Sb | 10.5 |
| Comparative Example 11 | 10.0 | Ag | Al alloy | Not performed | Bi Sb | Bi Sb | Bi Sb | Bi Sb | Bi Sb | Bi Sb | 18.8 |
| Comparative Example 12 | 12.0 | Ag | Al alloy | Not performed | Bi Sb | Bi Sb | Bi Sb | Bi Sb | Bi Sb | Bi Sb | 21.7 |
| Comparative Example 13 | 5.0 | Cu Ag | Al alloy | Not performed | Bi Sb | Bi Sb | Bi Sb | Bi Sb | Bi Sb | Bi Sb | 12.5 |

Tables 1 and 2 are charts showing a main composition at each depth of the overlay 12 for a plurality of Examples and Comparative Examples having different Sb concentrations (mass concentrations). In Examples 1 to 6 and Comparative Examples 1 to 6 in Table 1, the lining 11 is made of a 200-µm Cu alloy containing Sn, Ni, and Bi, the intermediate layer 13 is a 2-µm layer made of Ag—Sn, and the overlay 12 is a 15-µm layer. In Examples 7 to 12 and Comparative Examples 7 to 12, the lining 11 is made of a 300-µm Al alloy containing Sn and Si, the intermediate layer 13 is a 4-µm layer made of Ag, and the overlay 12 is a 15-µm layer. In Example 13 and Comparative Example 13, the lining 11 is made of a 300-µm Al alloy containing Sn and Si, the intermediate layer 13 includes a 1-µm first intermediate layer made of Cu and a 5-µm second intermediate layer made of Ag, and the overlay 12 is a 15-µm layer. An oxidation treatment in paraffin oil was performed in the Examples, but no oxidation treatment was performed in the Comparative Examples.

The Sb concentration is 2.0 mass % to 12.0 mass % in Examples 1 to 6 and Examples 7 to 12, and the Sb concentration is 2.0 mass % to 12.0 mass % also in Comparative Examples 1 to 6 and Comparative Examples 7 to 12. In Example 13 and Comparative Example 13, the Sb concentration is 5.0 mass %. The concentration of Sb in the overlay 12 can be adjusted by increasing or decreasing the Sb concentration in a plating bath for electroplating.

In Tables 1 and 2, the main composition at each depth position from the outermost surface of the overlay 12 is shown. That is, the main composition at each of depths, i.e., 0 µm (outermost surface), 0.01 µm, 0.05 µm, 0.1 µm, 1 µm, and 3 µm, of each sample is shown.

The main composition at each depth position was measured using a scanning X-ray photoelectron spectrometer (PHI X-tool manufactured by ULVAC-PHI, INCORPORATED). Specifically, a measurement region was set at each of depth positions, i.e., 0 µm, 0.01 µm, 0.05 µm, 0.1 µm, 1 µm, and 3 µm in the depth direction of the overlay 12, and X-ray photoelectron spectroscopy analysis was performed. As regards the size and shape of the measurement region, the measurement region had a square shape of 2 mm on each side, the compositions present in the measurement region at each depth were identified from binding energy obtained for the measurement region, and an existence ratio among the respective compositions was quantified from the peak area ratio. The composition having an existence proportion equal to or above a threshold was identified as the main composition. The main composition may be defined by various techniques, and, for example, N (N is an integer of 1 or more) compounds in a descending order of existence proportion may be defined as the main compositions. Also, top N compounds in terms of existence proportion, having an existence proportion equal to or above the threshold, may be the main compositions. In any case, the compound having the highest existence proportion is the main composition.

For example, in all of Examples 1 to 13, the main composition of the outermost surface is Bi—Sb oxide (Bi—Sb—O). In all of Examples 1 to 13, at least on the outermost surface, the Bi—Sb—O compound has a higher existence proportion than those of other compounds and single metals. In Examples 1 to 13, Bi—Sb oxide is formed as the main composition over the entire sliding surface between the overlay 12 and the counter shaft 2. On the other hand, in all of Comparative Examples 1 to 13, the main composition of the outermost surface is not an oxide.

Figure 3:
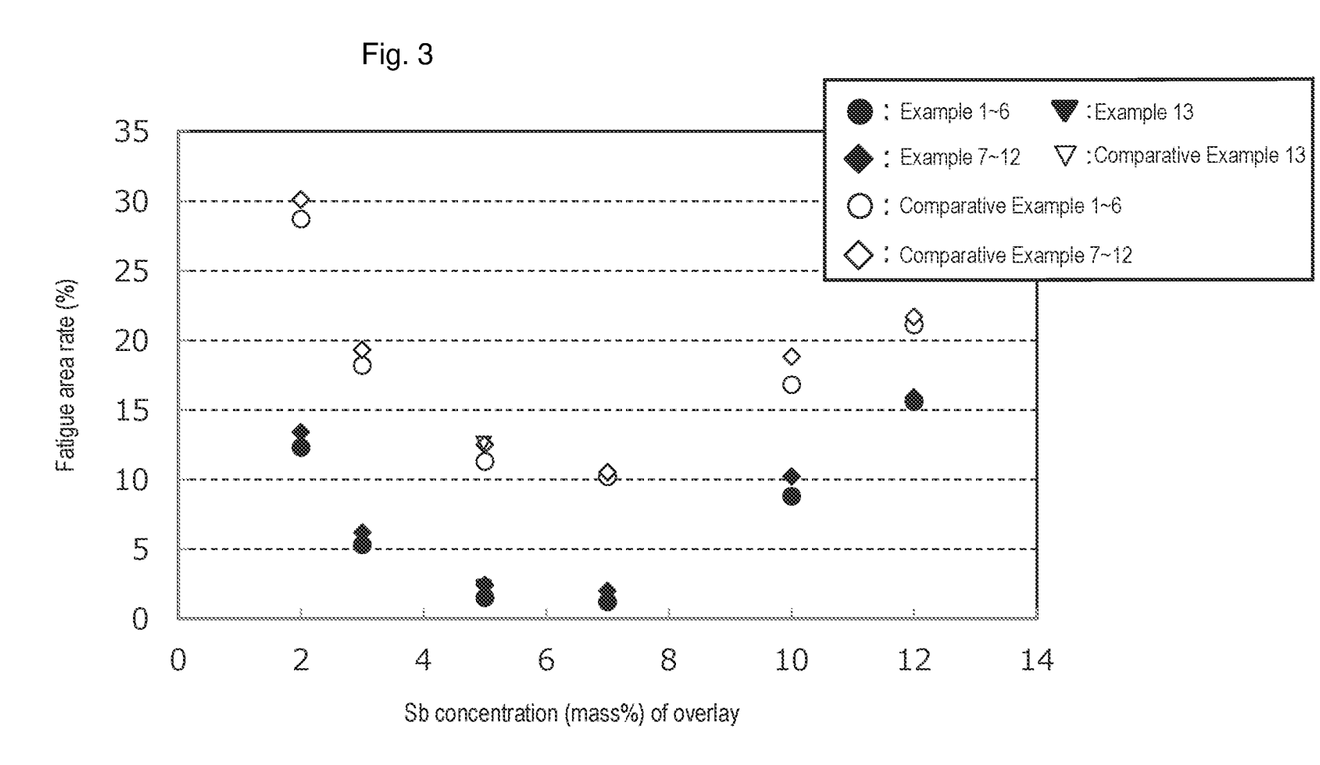
FIG. 3 is a graph of fatigue area rates.

Bi—Sb oxide is a highly stable compound. Therefore, the presence of Bi—Sb oxide on the outermost surface can protect the overlay 12. Therefore, Examples 1 to 13 in which Bi—Sb oxide is present on the outermost surface have higher fatigue resistance than those of Comparative Examples 1 to 13 in which no Bi—Sb oxide is present on the outermost surface. In Table 1, the results of a fatigue test performed on the sliding members of Examples 1 to 13 and Comparative Examples 1 to 13 are shown as fatigue area rates (%). FIG. 3 is a graph of the fatigue area rates. In FIG. 3, the horizontal axis represents the Sb concentration in the overlay 12. Examples 1 to 6 are plotted by black circles, Examples 7 to 12 are plotted by black squares, and Example 13 is plotted by a black triangle. Comparative Examples 1 to 6 are plotted by white circles, Comparative Examples 7 to 12 are plotted by white squares, and Comparative Example 13 is plotted by a white triangle.

Figure 2:
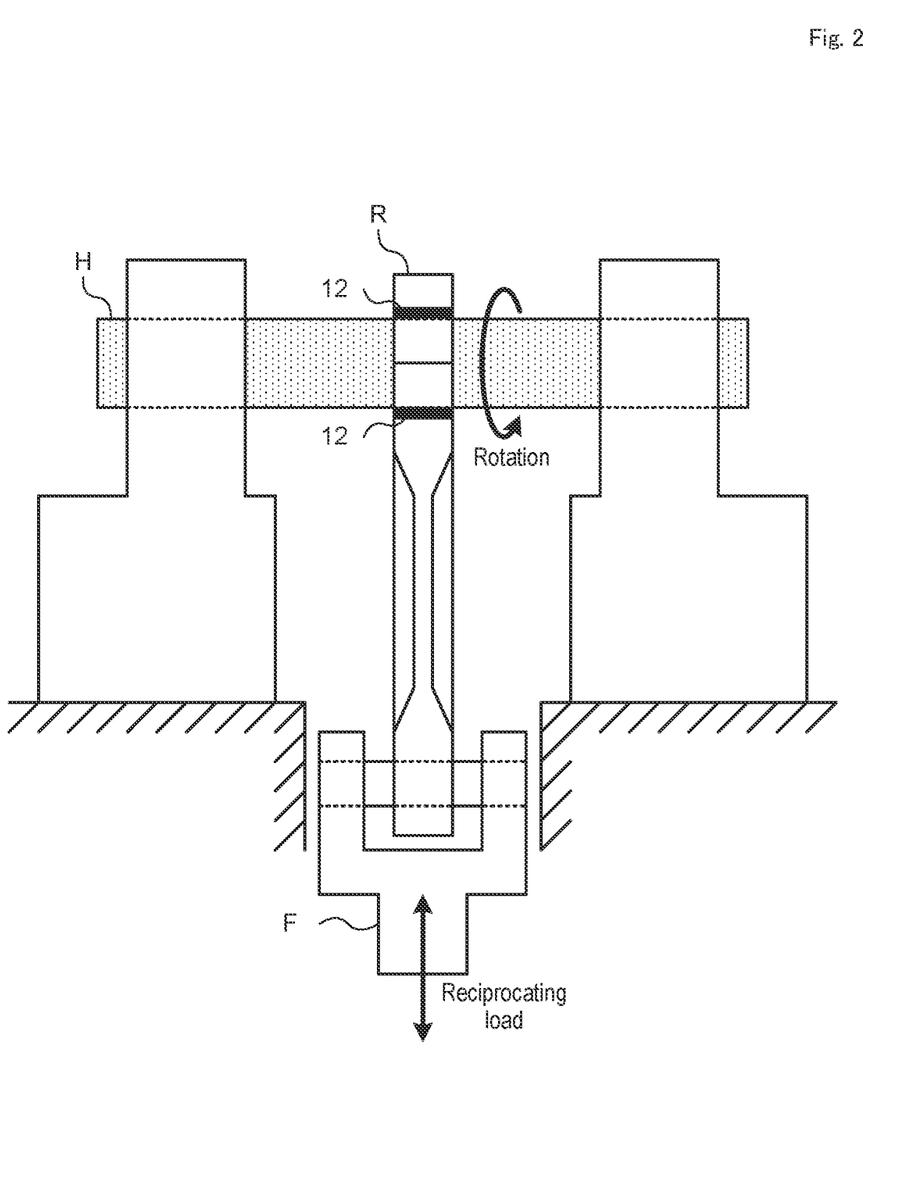
FIG. 2 is an explanatory diagram of a fatigue test.

The fatigue area rate was measured through the following procedures. FIG. 2 is an explanatory diagram of the fatigue test. First, as shown in FIG. 2, a connecting rod R having cylindrical through holes formed at both ends in the longitudinal direction was prepared, and a test shaft H (hatching) was borne in the through hole at one end.

An overlay 12 (black) similar to that of the sliding member 1 was formed on the inner peripheral surface of the through hole for bearing the test shaft H formed in the connecting rod R. The test shaft H was borne on both outer sides of the connecting rod R in the axial direction of the test shaft H, and the test shaft H was rotated so that a sliding speed arrived at 6.6 m/sec. The sliding speed is a relative speed between the surface of the overlay 12 and the test shaft H. The end portion of the connecting rod R on the side opposite to the test shaft H was connected to a moving body F reciprocating in the longitudinal direction of the connecting rod R, and the reciprocating load of the moving body F was set to 100 MPa. Also, engine oil at about 140° C. was fed between the connecting rod R and the test shaft H.

By continuing the above state for 100 hours, the fatigue test of the overlay 12 was carried out. After the fatigue test, the inner surface (sliding surface) of the overlay 12 was photographed from a position on a straight line orthogonal to the surface in such a manner that the straight line served as the main optical axis. The taken image was used as an evaluation image. Then, the damaged portion in the surface of the overlay 12 reflected in the evaluation image was observed with a binocular (magnifying glass) and identified. The percentage of a value obtained by dividing the damaged portion area, which was the area of the damaged portion, by the area of the entire surface of the overlay 12 reflected in the evaluation image was measured as the fatigue area rate.

When samples having the same Sb concentration (for example, Example 1 and Comparative Example 1) are compared based on Tables 1 and 2 and FIG. 3, the fatigue area rates of Examples 1 to 6 having Bi—Sb oxide on the outermost surface are smaller than the fatigue area rates of Comparative Examples 1 to 6 at all of the Sb concentrations. The fatigue area rates of Examples 7 to 12 are smaller than the fatigue area rates of Comparative Examples 7 to 12. The fatigue area rate of Example 13 is smaller than the fatigue area rate of Comparative Example 13. Therefore, it can be said that the sliding member 1 having Bi—Sb oxide has higher fatigue resistance than that of the sliding member having no Bi—Sb oxide.

The presence of Bi—Sb oxide on the outermost surface as in Examples 1 to 13 can reduce the possibility of oxidation of the elements present in a portion deeper than the outermost surface. Therefore, in the overlay 12, it is possible to prevent bismuth oxide ($Bi_2O_3$) from being produced as the main composition and growing.

That is, bismuth oxide is brittle, and thus, when formed in the overlay 12, may fall off in the process of using the sliding member. However, the presence of Bi—Sb oxide on the outermost surface as in Examples 1 to 13 can prevent bismuth oxide from being produced by oxidation of Bi, in a region deeper than the outermost surface. Therefore, in Examples 1 to 13, the prevention of the production of bismuth oxide is also considered to contribute to the improvement of fatigue resistance. In Examples 1 to 13, the Sb concentration is 2.0 mass % to 12.0 mass %, but, at any Sb concentration in this concentration range, the fatigue area rate is smaller when Bi—Sb oxide is present on the surface than that when no Bi—Sb oxide is present. Therefore, the fatigue resistance is considered to be improved due to the formation of Bi—Sb oxide at an arbitrary concentration where the Sb concentration of the overlay 12 is more than 0 mass %.

If it is desired to obtain the sliding member 1 in which a fatigue resistance area rate in the fatigue test described above falls within a specific value range, the Sb concentration of the overlay 12 may be controlled. For example, if it is desired to obtain a fatigue area rate of 11% or less, it is preferable to set the Sb concentration of the overlay 12 to 3.0 mass % or more and 10.0 mass % or less.

Furthermore, in Examples 2 to 6 and Examples 8 to 13, the main compositions are Bi—Sb oxide and antimony oxide ($Sb_2O_3$) immediately below the layers whose main composition is Bi—Sb oxide. For example, in Example 2, Bi—Sb oxide is present as the main composition in the surface layer, and the main compositions are Bi—Sb oxide and antimony oxide ($Sb_2O_3$) at a depth of 0.1 μm immediately below the surface layer. Further, at a deeper depth of 1 μm, no oxide is observed, and Bi and Sb exist as the main compositions. As described above, in Examples 2 to 6 and Examples 8 to 13, an oxide other than Bi—Sb—O is also produced at the deep positions of the overlay 12. However, when Bi and Sb are compared, Sb is more easily oxidized, and thus antimony oxide is produced more than bismuth oxide. Therefore, the production of bismuth oxide is suppressed, no bismuth oxide is present as the main composition (as a compound having the highest existence proportion or a compound having the second highest existence proportion), and fatigue resistance is improved.

Therefore, it is possible to prevent the sliding member from becoming brittle due to bismuth oxide. Thus, even when the Sb concentration is low, if the Bi—Sb oxide is formed on the outermost surface, the Bi—Sb oxide protects the surface, thereby making it possible to prevent the production of bismuth oxide and to improve the fatigue resistance. On the other hand, even if the sliding member in which the Sb concentration of the overlay 12 is 0, for example, the sliding member in which the overlay 12 is made of Bi or made of Bi—Cu, Bi—Sn, or the like, and the other layers are the same as those in Examples 1 to 13 is subjected to an oxidation treatment, it is difficult to protect the outermost surface with an oxide.

That is, when the oxidation treatment is performed on the overlay 12 not containing Sb, bismuth oxide ($Bi_2O_3$) is formed on the outermost surface. Then, when the above-described fatigue test is performed on the sample in which bismuth oxide is formed on the outermost surface, a fatigue area rate exceeding 20% is obtained. That is, the sliding member in which bismuth oxide is formed on the outermost surface is deteriorated in fatigue resistance as compared with the Examples, for example, because brittle bismuth oxide falls off. In the Examples, Bi—Sb oxide is formed on the outermost surface, which suppresses production of bismuth oxide and falling-off of bismuth oxide. Therefore, Bi is maintained in the overlay 12 for a long period of time, and high conformability due to soft Bi can be self-satisfied for a long period of time.

Examples 1 to 6, Examples 7 to 12, and Example 13 are different in intermediate layer 13 and the lining 11. That is, the intermediate layers 13 of Examples 1 to 6 are made of Ag—Sn. The intermediate layers 13 of Examples 7 to 12 are made of Ag. The intermediate layer of Example 13 includes a first intermediate layer (Cu) and a second intermediate layer (Ag). These Examples, when compared, are the same in main composition of the overlay 12, and their fatigue area rates are also very close. Furthermore, as compared with Comparative Examples 1 to 6, Comparative Examples 7 to 12, and Comparative Example 13, the Examples are smaller in fatigue resistance area. Therefore, it is considered that the improvement of the fatigue resistance area by forming Bi—Sb oxide on the outermost surface of the overlay 12 made of Bi and Sb can be achieved regardless of the compositions of the intermediate layer 13 and the lining 11.

The main composition at each depth position from the outermost surface shown in Table 1 are results of measurement for the sliding members before the fatigue test. On the other hand, the main composition was measured also after the fatigue test. As a result, in both of Examples 1 to 13 and Comparative Examples 1 to 13, no change was observed in the main composition at each depth position. That is, on the outermost surfaces of Comparative Examples 1 to 13, no oxide was formed as the main composition even after the fatigue test. Therefore, it is difficult to uniformly form Bi—Sb oxide over the entire outermost surface in a normal use process of the sliding member 1 in a state where the oxidation treatment is not actively performed as in Comparative Examples 1 to 13. On the other hand, when the oxidation treatment is actively performed as in Examples 1 to 13, Bi—Sb oxide is uniformly formed over the entire outermost surface.

Even though it is difficult to form Bi—Sb oxide on the outermost surface in the normal use process in Comparative Examples 1 to 13, Bi can be locally oxidized to produce bismuth oxide since no Bi—Sb oxide is formed on the outermost surface in Comparative Examples 1 to 13. When bismuth oxide is produced, fatigue resistance is deteriorated due to falling-off of the bismuth oxide or the like since the bismuth oxide is brittle. Therefore, as in Examples 1 to 13, Bi—Sb oxide is formed over the entire outermost surface by performing the oxidation treatment in advance, whereby fatigue resistance can be reliably improved.

(3) Other Embodiments

In the above embodiment, the sliding members 1 constituting the sliding bearing A for bearing the crankshaft of an engine have been illustrated, but a sliding bearing A for another purpose may be formed by the sliding members 1 of the present invention. For example, a radial bearing such as a transmission gear bush or a piston pin bush/boss bush may be formed by the sliding member 1 of the present invention. Furthermore, the sliding member of the present invention may be used in thrust bearings, various washers, or swash plates for car air-conditioner compressors.

Further, the matrix of the lining 11 is not limited to the Cu alloy or Al alloy, and it suffices that the material of the matrix is selected depending on the hardness of the counter shaft 2. Also, the back metal 10 is not essential and may not be used.

REFERENCE SIGNS LIST

1 Sliding member
2 Counter shaft
10 Back metal
11 Lining
12 Overlay
13 Intermediate layer
A Bearing
F Moving body
H Test shaft
R Connecting rod

The invention claimed is:

1. A sliding member comprising an overlay formed of an alloy plating film of Bi and Sb, wherein Bi—Sb oxide is formed as a main composition over an entire sliding surface of the overlay, whereby production of bismuth oxide is prevented.

2. The sliding member according to claim 1, wherein a concentration of Sb in the overlay is 2.0 mass % or more and 12.0 mass % or less.

3. The sliding member according to claim 1, wherein a concentration of Sb in the overlay is 3.0 mass % or more and 10.0 mass % or less.

4. The sliding member according to claim 1, wherein antimony oxide is formed immediately below the Bi—Sb oxide in a depth direction of the overlay.

* * * * *